United States Patent
Bachu et al.

(10) Patent No.: US 9,633,065 B2
(45) Date of Patent: *Apr. 25, 2017

(54) EFFICIENT DATA REHYDRATION

(71) Applicant: EMC IP Holding Company LLC, Hopkinton, MA (US)

(72) Inventors: Kiran K. Bachu, Cupertino, CA (US); Venu Varma, San Jose, CA (US); Daniel Ravan, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/466,756

(22) Filed: Aug. 22, 2014

(65) Prior Publication Data

US 2015/0052366 A1    Feb. 19, 2015

Related U.S. Application Data

(63) Continuation of application No. 13/250,557, filed on Sep. 30, 2011, now Pat. No. 8,849,878.

(51) Int. Cl.
| | |
|---|---|
| *G06F 7/00* | (2006.01) |
| *G06F 17/00* | (2006.01) |
| *G06F 17/30* | (2006.01) |
| *G06F 21/60* | (2013.01) |
| *H04L 29/08* | (2006.01) |

(52) U.S. Cl.
CPC ........ *G06F 17/30371* (2013.01); *G06F 17/30* (2013.01); *G06F 21/602* (2013.01); *H04L 67/1097* (2013.01)

(58) Field of Classification Search
CPC .............. G06F 17/30; G06F 17/30371; G06F 17/30303

See application file for complete search history.

(56) References Cited

U.S. PATENT DOCUMENTS

| | | | | |
|---|---|---|---|---|
| 8,799,467 | B2 * | 8/2014 | Shah | G06F 3/0608 709/224 |
| 8,825,972 | B1 * | 9/2014 | Tsaur | G06F 11/1453 707/646 |
| 8,849,878 | B1 * | 9/2014 | Bachu | G06F 17/30 707/823 |
| 2005/0060537 | A1 * | 3/2005 | Stamos | G06F 21/552 713/156 |
| 2007/0027854 | A1 * | 2/2007 | Rao | G06F 17/3066 |

(Continued)

*Primary Examiner* — Susan Chen
(74) *Attorney, Agent, or Firm* — Van Pelt, Yi & James LLP (57) ABSTRACT

A system for an efficient data rehydration comprises a server, one or more reader device managers, a writer device manager, and a verifier. The server is for receiving a restore list comprising a plurality of storage locations and lengths for performing a data rehydration. The one or more reader device managers is for reading a data set indicated by the restore list by reading the plurality of storage locations for the lengths from one or more storage nodes. The plurality of storage locations and lengths indicate chunks from a client system stored as part of a full or as an incremental backup session on a storage device attached to a storage node. The writer device manager is for transferring the data set to a save node. A verifier is for verifying transfer of the data set.

17 Claims, 11 Drawing Sheets

(56) References Cited

U.S. PATENT DOCUMENTS

2011/0167221 A1* 7/2011 Pangal ................ G06F 11/1453
711/117
2011/0289052 A1* 11/2011 Rambacher ....... G06F 17/30575
707/624

* cited by examiner

Restore List

| Name | Backup Version | Start Point | Length |
|------|----------------|-------------|--------|
| file2 | T4 | 100 | 100 |
| file1 | T1 | 100 | 400 |
| file4 | T4 | 200 | 100 |
| file3 | T5 | 100 | 300 |
| file5 | T5 | 400 | 100 |

Coalesced Restore List

| Name | Backup Version | Start Point | Length |
|------|----------------|-------------|--------|
| file2file4 | T4 | 100 | 200 |
| file1 | T1 | 100 | 400 |
| file3file5 | T5 | 100 | 400 |

EFFICIENT DATA REHYDRATION

CROSS REFERENCE TO OTHER APPLICATIONS

This application is a continuation of U.S. patent application Ser. No. 13/250,557, now U.S. Pat. No. 8,849,878, entitled EFFICIENT DATA REHYDRATION filed Sep. 30, 2011 which is incorporated herein by reference for all purposes.

BACKGROUND OF THE INVENTION

Enterprises as well as individuals are becoming increasingly dependent on computers. As more and more data are generated, the need for efficient and reliable filesystems is increasing. There are a variety of filesystems in existence today, utilizing both local and remote storage. Some filesystems use both an originating filesystem and a replica filesystem in order to ensure the safety of the data by copying the data from the local to the replica system. Some replica filesystems include data versioning, enabling recovery of the state of the originating filesystem at multiple previous points in time by including multiple versions of the originating data. Each version of the data may comprise a complete version of the data, or each version of the data may comprise an incremental version of the data, describing changes to the data since the previous version was stored. Some systems create a full backup at regularly scheduled intervals (e.g., once a week, once a month) and create incremental backups at points between the full backups. When database systems become very large, even creating a full backup once a week becomes unduly cumbersome, it is desirable to only create incremental backups after the initial backup system setup. However, if a full backup is never created, any future restore will include changes that must be included from a very large number of incremental backups.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for an efficient data rehydration is disclosed. The system comprises a server, one or more reader device managers, a writer device manager, and a verifier. The server is for receiving a restore list comprising a plurality of storage locations and lengths for performing a data rehydration. The one or more reader device managers is for reading a data set indicated by the restore list by reading the plurality of storage locations for the lengths from one or more storage nodes. The plurality of storage locations and lengths indicate chunks from a client system stored as part of a full or as an incremental backup session on a storage device attached to a storage node. The writer device manager is for transferring the data set to a save node. A verifier is for verifying transfer of the data set.

An efficient data rehydration system is disclosed. The efficient data rehydration system comprises a backend system for a backup storage system designed for performing large transactions involving reading, processing, and writing data. This system is designed to perform various recover storage operations efficiently including the creation of a synthetic full backup, a backup clone operation, and a backup data staging operation. The efficient data rehydration system comprises a recover storage backend for coordinating the system, a recover storage front end for coordinating user interaction and initiating processes, one or more reader device managers for reading data stored in the backup storage system on one or more backup storage devices, and a write device manager for writing data to a backup storage device. The recover storage backend coordinates reading data from one or more backup storage devices, processing the data, and storing the processed data in a backup storage device. In the event that the data is stored in a processed form (e.g., compressed, encrypted, deduplicated, etc.), the processing is undone by the recover storage backend to return the data to plain state before further processing is performed. In the event that the data is desired to be written to storage in a processed form (e.g., compressed, encrypted, deduplicated, etc.), the processing is performed by the recover storage backend before processing. In some embodiments, the efficient data rehydration engine includes buffer management and optimized queues for handling multiple read streams and a write stream.

In various embodiments, an efficient data rehydration system is used for synthetic full processing, data copying, data cloning, data migration, in-transit data encryption and/or compression, in-transit data deduplicated, or any other appropriate data assembly and reconstruction. In some of the following, the description of the efficient data rehydration system will be described in terms of processing with respect to synthetic full backups, however, it is obvious to a person practiced in the art how the same efficient data rehydration system can be used for other system embodiments including data copying, data cloning, data migration, in-transit data encryption and/or compression, in-transit data deduplicated, or any other appropriate data assembly and reconstruction.

In some embodiments, a synthetic full backup creation process is initiated by the recover storage front end delivering a restore list to the recover storage backend with the indication that a synthetic full backup is to be performed. The recover storage backend performs the synthetic full backup creation process by requesting each file from the restore list be retrieved from a backup storage device, combining the files into their original directory structure form, and indicating the complete directory structure be stored as a new synthetic full backup. For example, the backend takes the input in the form of chunk list (e.g., a list of offsets and lengths where the data chunks are located) and uses this information as to where to get the data from to move the data to the destination device. For the case where the recover list is created appropriately to capture the state of the directory structure, the synthetic full backup creation process has the effect of creating a new full backup on the backup system without requiring the very large bandwidth necessary to create a conventional full backup.

Figure 1:
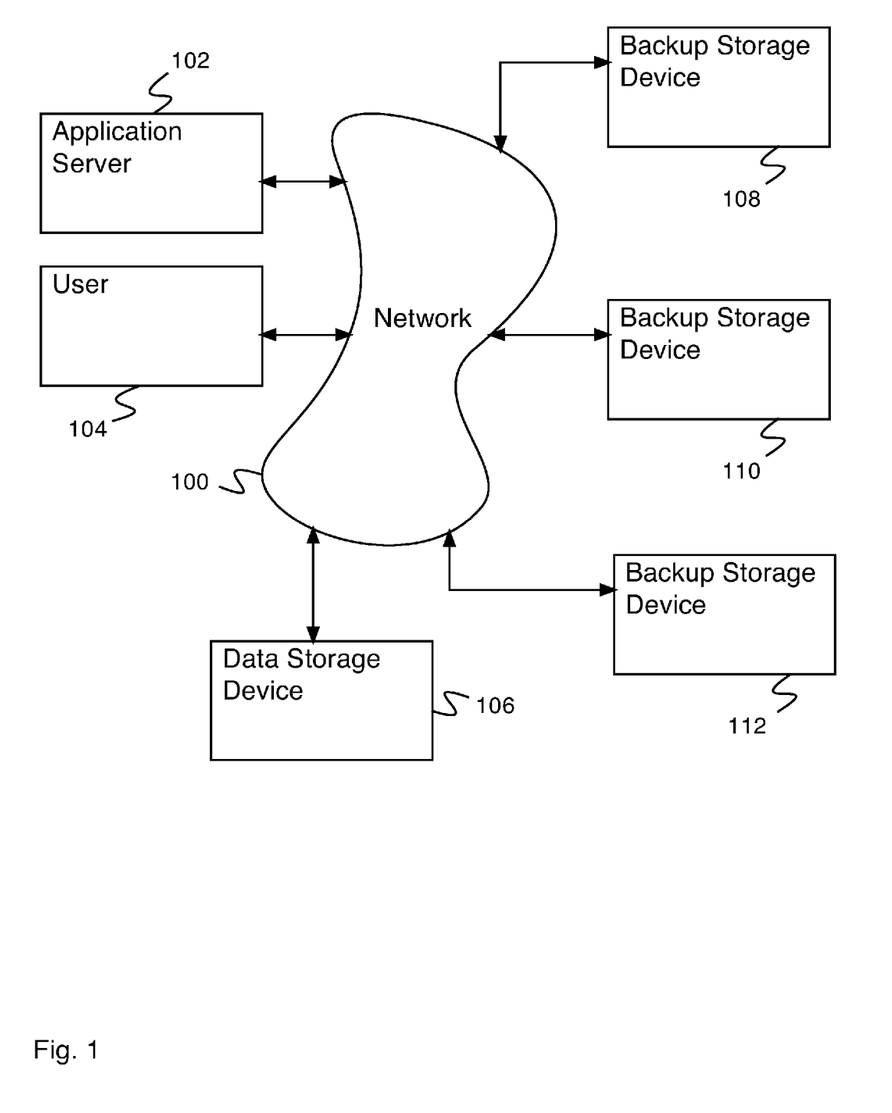
FIG. 1 is a block diagram illustrating an embodiment of a system for an efficient data rehydration.

FIG. 1 is a block diagram illustrating an embodiment of a system for an efficient data rehydration. In the example shown, the system comprises application server 102, user 104, data storage device 106, backup storage device 108, backup storage device 110, and backup storage device 112, each communicating with network 100. User 104 accesses applications executing on application server 102 and data stored in data storage device 106. In some embodiments, user 104 accesses data stored on backup storage device 108, backup storage device 110, and backup storage device 112. In various embodiments, user 104 comprises a network accessing terminal, a desktop computer, a laptop computer, a workstation, or any other appropriate system for a user accessing the network system. Software is used to coordinate synchronization of data between data storage device 106, backup storage device 108, backup storage device 110, and backup storage device 112. In various embodiments, software used to coordinate synchronization of data is stored on application server 102, data storage device 106, backup storage device 108, backup storage device 110, backup storage device 112, or on any other appropriate computing device. In various embodiments, backup storage device 108, backup storage device 110, and backup storage device 112 comprise deduplicating backup systems, compressed backup systems, encrypted backup systems, or backup systems comprising data stored in any other appropriate way.

Network 100 comprises one or more of the following: a local area network, a wide area network, a wired network, a wireless network, the Internet, a fiber network, a storage area network, or any other appropriate network enabling communication. In various embodiments, data storage device 106, backup storage device 108, backup storage device 110, and backup storage device 112 comprise single storage devices such as a hard disk, a tape drive, a semiconductor memory, a plurality of storage devices such as a redundant array system (e.g., a redundant array of independent disks (RAID)), a system for storage such as a library system or network attached storage system, a virtual storage (e.g., a LUN, or logical unit), or any other appropriate storage device or system. In various embodiments, backup storage device 108, backup storage device 110, and backup storage device 112 comprise separate partitions on the same disk, comprise multiple disks, comprise multiple volumes, comprise volumes attached to multiple computing systems, or are separate in any other appropriate way.

In some embodiments, backup storage device 108, backup storage device 110, and backup storage device 112 store not only the current state of data storage device 106, but also information describing previous states of data storage device 106. In some embodiments, backup storage device 108, backup storage device 110 and backup storage device 112 are configured to keep a record of every change made to data storage device 106. In some embodiments, backup storage device 108, backup storage device 110 and backup storage device 112 only keep a record of changes made to data storage device 106 at certain times (e.g., at fixed times of the day, at a predetermined interval, after a certain number of changes, etc.). In some embodiments, every backup record made by backup storage device 108, backup storage device 110 and backup storage device 112 comprises a complete copy of the data stored on data storage device 106 (e.g., comprises a full backup). In some embodiments, some of the backup records made by backup storage device 108, backup storage device 110 and backup storage device 112 comprise a complete copy of the data stored on data storage device 106 and some of the backup records stored by backup storage device 108, backup storage device 110 and backup storage device 112 comprise an incremental copy of the data stored on data storage device 106 representing changes made since the last backup record was made (e.g., comprise an incremental backup). In some embodiments, incremental backup records are stored on one or more backup storage devices (e.g., backup storage device 108 and backup storage device 110), and full backup records are stored on a different backup storage device (e.g., backup storage device 112). In some embodiments, after an initial full backup record is created, only incremental backup records are created. In some embodiments, full backup records are created by a backup storage device (e.g., backup storage device 112) without communicating with data storage device 106, by assembling data from previous full and incremental backup records. In some embodiments, the full and incremental backup records are stored on one or more backup storage devices (e.g., backup storage device 108 and backup storage device 110) and the new full backup record is stored on a separate backup storage device (e.g., backup storage device 112).

Figure 2:
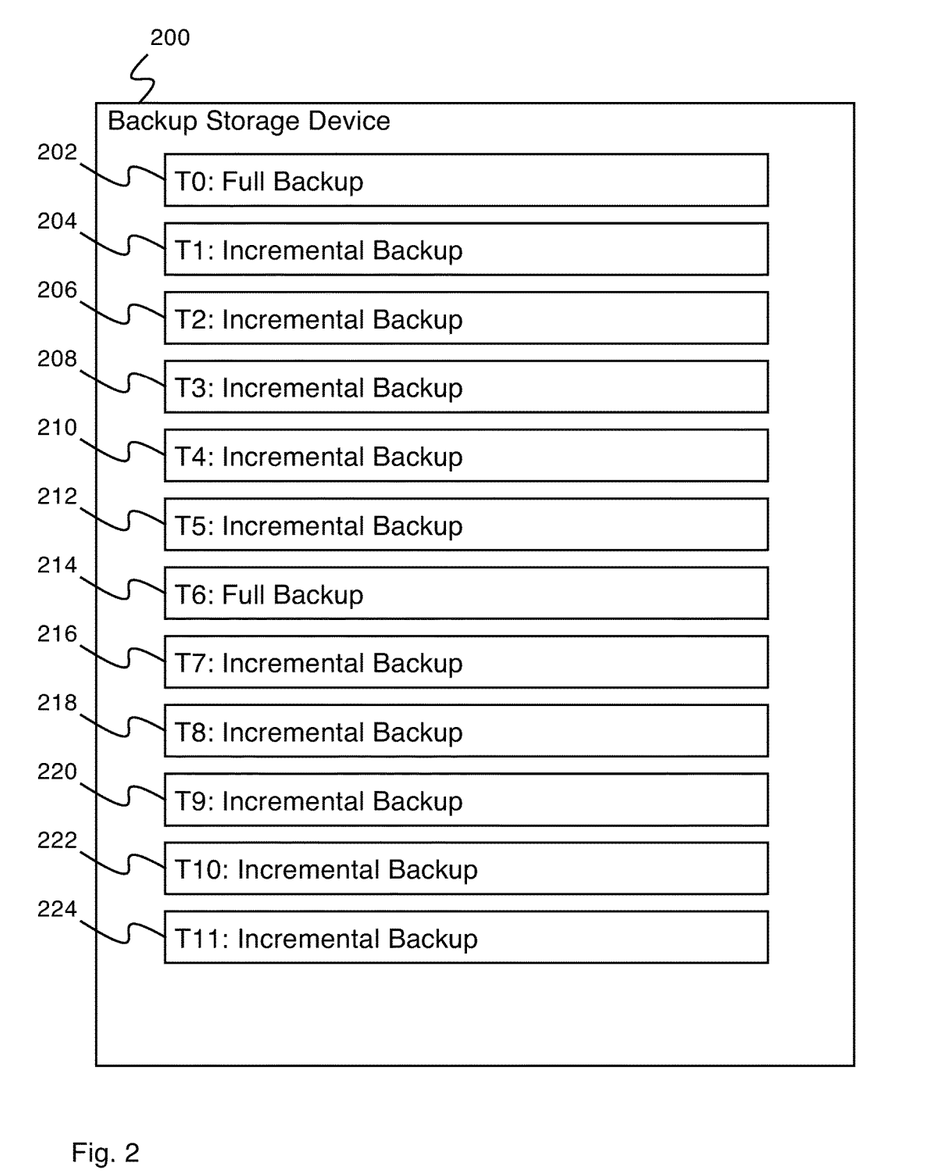
FIG. 2 is a block diagram illustrating an embodiment of a backup storage device.

FIG. 2 is a block diagram illustrating an embodiment of a backup storage device. In various embodiments, backup storage device 200 comprises backup storage device 108 of FIG. 1, backup storage device 110 of FIG. 1, or backup storage device 112 of FIG. 1. In some embodiments, backup storage device 200 stores backup records of a data storage device (e.g., data storage device 106 of FIG. 1). In the example shown, backup storage device 200 comprises full backup records and incremental backup records. Full backup records comprise the complete contents of the data storage device. Incremental backup records comprise the changes made to the data storage device since the last backup record was stored. Backup storage device 200 comprises full backup 202, stored at time T0. Backup storage device 200 additionally comprises incremental backup 204, stored at time T1; incremental backup 206, stored at time T2; incremental backup 208, stored at time T3; incremental backup 210, stored at time T4; and incremental backup 212, stored at time T5. Each incremental backup represents changes made since the previous backup was stored. Recovering the state of the data storage device at time T5 requires some or all of full backup 202, incremental backup 204, incremental backup 206, incremental backup 208, incremental backup 210, and incremental backup 212.

Backup storage device 200 additionally comprises full backup 214, stored at time T6. Backup storage device 200 further comprises incremental backup 216, stored at time T7; incremental backup 218, stored at time T8; incremental backup 220, stored at time T9; incremental backup 222, stored at time T10; and incremental backup 224, stored at time T11. Recovering the state of the data storage device at time T11 requires some or all of full backup 214, incremental backup 216, incremental backup 218, incremental backup 220, incremental backup 222, and incremental backup 224. Recovering the state of the data storage device at time T11 does not require any backups made before time T6, as backup 214, made at time T6, is a full backup, and captures the complete state of the data storage device at that time.

Figure 3:
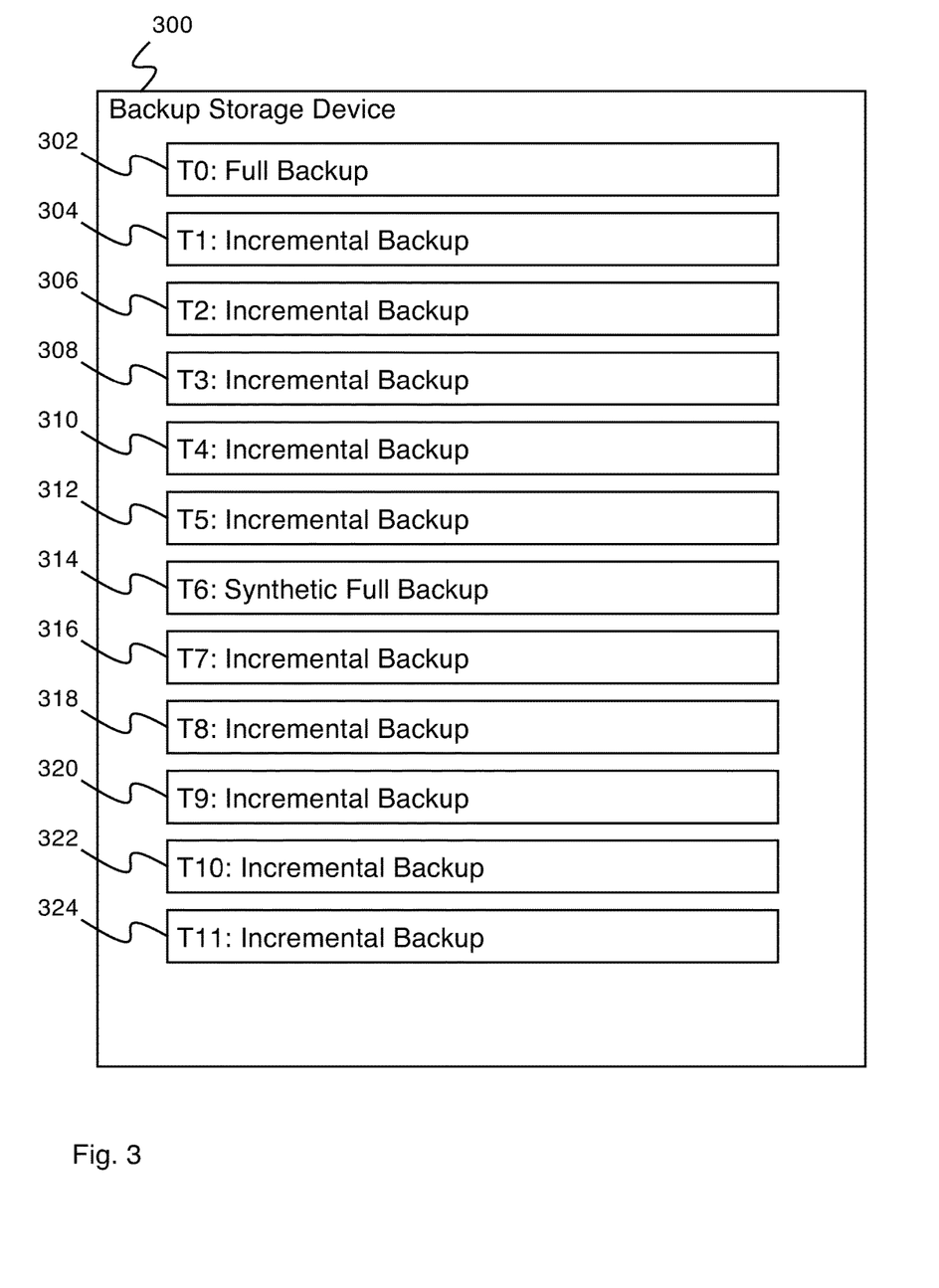
FIG. 3 is a block diagram illustrating an embodiment of a backup storage device.

FIG. 3 is a block diagram illustrating an embodiment of a backup storage device. In various embodiments, backup storage device 300 comprises backup storage device 108 of FIG. 1, backup storage device 110 of FIG. 1, or backup storage device 112 of FIG. 1. In some embodiments, backup storage device 300 stores backup records of a data storage device (e.g., data storage device 106 of FIG. 1). In the example shown, backup storage device 300 comprises full backup records and incremental backup records. Full backup records comprise the complete contents of the data storage device. Incremental backup records comprise the changes made to the data storage device since the last backup record was stored. Backup storage device 300 comprises full backup 302, stored at time T0. Backup storage device 300 additionally comprises incremental backup 304, stored at time T1; incremental backup 306, stored at time T2; incremental backup 308, stored at time T3; incremental backup 310, stored at time T4; and incremental backup 312, stored at time T5. Each incremental backup represents changes made since the previous backup was stored. Recovering the state of the data storage device at time T5 requires some or all of full backup 302, incremental backup 304, incremental backup 306, incremental backup 308, incremental backup 310, and incremental backup 312.

Backup storage device 300 additionally comprises synthetic full backup 314, created at time T6. Synthetic full backup 314 comprises a full backup made by integrating the contents of full backup 302, incremental backup 304, incremental backup 306, incremental backup 308, incremental backup 310, and incremental backup 312. Creating synthetic full backup 314 does not require retrieval of any additional data from the data storage device, does not require any communication between backup storage device 300 and the data storage device, and does not require any processing to be performed on data storage device 300. Synthetic full backup 314 is created at time T6, but is only created with data retrieved until time T5, so synthetic full backup 314 corresponds to a full backup created at T5. In some embodiments, the first step in creating a synthetic full backup is the creation of a current incremental backup, which is used to ensure the synthetic full backup is current. This is equivalent to setting T6 immediately after T5, i.e., creating synthetic full backup 314 immediately after incremental backup 312 is complete.

Backup storage device 300 further comprises incremental backup 316, stored at time T7; incremental backup 318, stored at time T8; incremental backup 320, stored at time T9; incremental backup 322, stored at time T10; and incremental backup 324, stored at time T11. Recovering the state of the data storage device at time T11 requires some or all of synthetic full backup 314, incremental backup 316, incremental backup 318, incremental backup 320, incremental backup 322, and incremental backup 324. Recovering the state of the data storage device at time T11 does not require any backups made before synthetic full backup 314 was created, as synthetic full backup 314 comprises all of the relevant backup information collected up until the point when it was created.

Figure 4:
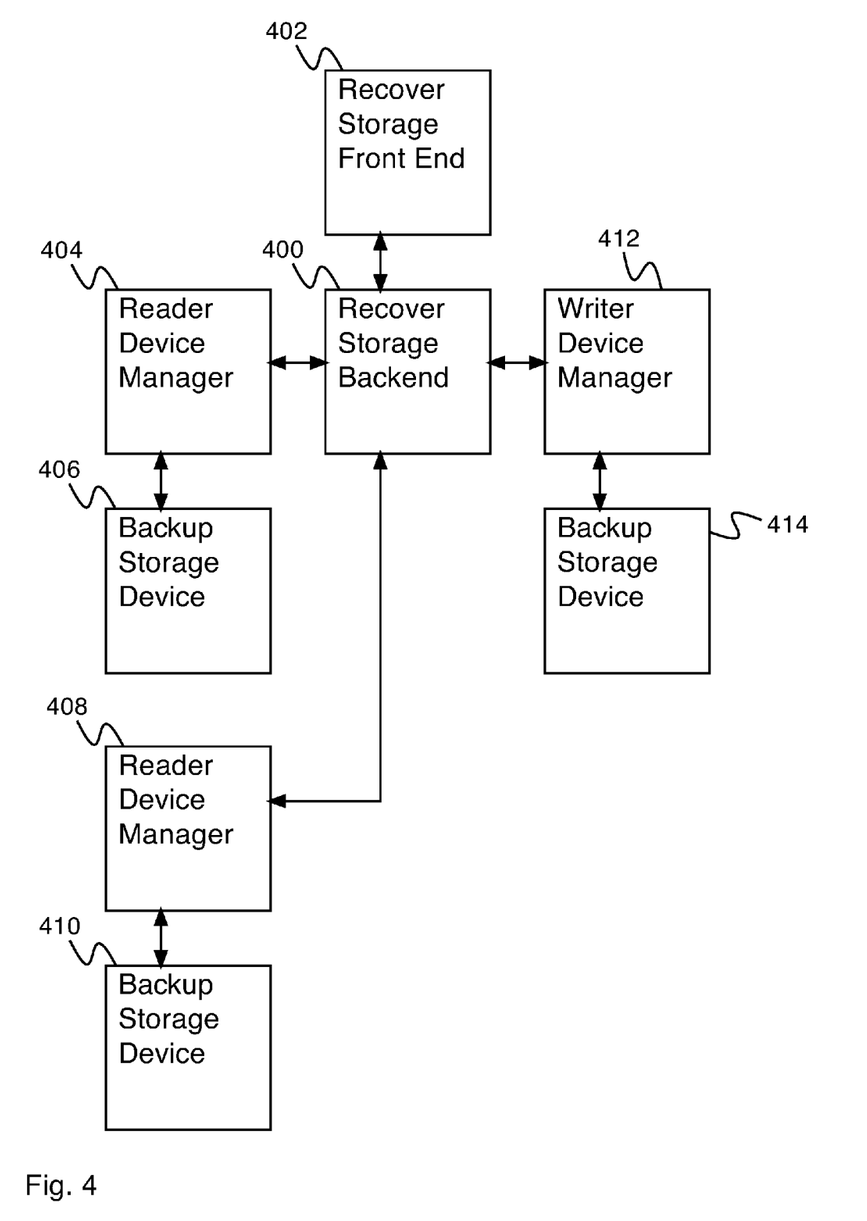
FIG. 4 is a block diagram illustrating an embodiment of a system for efficient data rehydration.

FIG. 4 is a block diagram illustrating an embodiment of a system for efficient data rehydration. In some embodiments, the system of FIG. 4 is comprised by the network system of FIG. 1. In the example shown, the system of FIG. 4 comprises recover storage backend 400 and recover storage front end 402. Recover storage backend 400 comprises a system for performing an efficient recover storage operation. In various embodiments, performing an efficient recover storage operation is used in the processes of creating a synthetic full backup, creating a data storage device clone, staging a data storage device, or any other appropriate data moving operation. In various embodiments, recover storage backend 400 is implemented as part of application server 102 of FIG. 1, as part of data storage device 106 of FIG. 1, as part of a backup storage device (e.g., backup storage device 108 of FIG. 1, backup storage device 110 of FIG. 1, or backup storage device 108 of FIG. 1), or as part of any other appropriate computing device. In some embodiments, a memory of the computing device is configured to provide a processor with instructions to perform instructions for an efficient recover storage backend (e.g., recover storage front end and/or recover storage backend). Recover storage front end 402 comprises a system for coordinating an efficient recover storage operation. In various embodiments, recover storage front end 402 is implemented as part of application server 102 of FIG. 1, as part of user 104 of FIG. 1, as part of data storage device 106 of FIG. 1, as part of a backup storage device (e.g., backup storage device 108 of FIG. 1, backup storage device 110 of FIG. 1, or backup storage device 108 of FIG. 1), or as part of any other appropriate computing device. In various embodiments, coordinating an efficient recover storage operation comprises indicating to recover storage backend 400 to perform an efficient recover storage operation, specifying parameters to recover storage backend for an efficient recover storage operation, delivering a file restore list for an efficient recover storage operation to recover storage backend 400, or any other appropriate efficient recover storage operation coordination function.

Reader device manager 404 and reader device manager 408 comprise reader device managers for managing reading data from a backup storage device. Reader device manager 404 coordinates reading information from backup storage device 406 and reader device manager 408 coordinates reading information from backup storage device 410. In various embodiments, an efficient recover storage operation accesses data stored on one backup storage device, on two backup storage devices, on five backup storage devices, on twenty-two backup storage devices, or on any other appropriate number of backup storage devices. One reader device manager is used to access each backup storage device. Each reader device manager (e.g., reader device manager 404, reader device manager 408) communicates with recover storage backend 400. Backup storage device 406 comprises a backup storage device (e.g., backup storage device 108 of FIG. 1) for storing data. Backup storage device 410 comprises a backup storage device (e.g., backup storage device 110 of FIG. 1) for storing data. Writer device manager 412 comprises a writer device manager for managing writing data to backup storage device 414. Backup storage device 414 comprises a backup storage device (e.g., backup storage device 112 of FIG. 1) for storing data. Writer device manager 412 communicates with recover storage backend 400.

In some embodiments, an efficient recover storage operation, conducted by recover storage backend 400, comprises indicating to one or more reader device mangers (e.g., reader device manager 404 and reader device manager 408) to read data from one or more backup storage devices (e.g., backup storage device 406 and backup storage device 401), receiving the data from the one or more reader device mangers, processing the data, and indicating to a writer device manager (e.g., writer device manager 412) to write the processed data to a backup storage device (e.g., backup storage device 414). In various embodiments, the data stored on the backup storage device or devices (e.g., backup storage device 406 and backup storage device 408) is compressed, encrypted, deduplicated, or stored in some other processed form. In the event the data stored on the backup storage device or devices is compressed, it must be uncompressed prior to processing. In the event the data stored on the backup storage device or devices is encrypted, it must be unencrypted prior to processing. In the event the data stored on the backup storage device or devices is deduplicated, it must be undeduplicated prior to processing (e.g., reconstruction of the data using the deduplicated segments used to store the data). In various embodiments, processing of data includes compression, encryption, deduplication, or any other appropriate processing. In some embodiments, when data is encrypted before storage to a backup storage device (e.g., backup storage device 406, backup storage device 410, or backup storage device 414), it is encrypted on a file-by-file basis. In some embodiments, when data is encrypted before storage to a backup storage device (e.g., backup storage device 406, backup storage device 410, or backup storage device 414), the entire stored directory structure is encrypted as a whole. In some embodiments, when data is compressed before storage to a backup storage device (e.g., backup storage device 406, backup storage device 410, or backup storage device 414) it is compressed on a file-by-file basis. In some embodiments, when data is compressed before storage to a backup storage device (e.g., backup storage device 406, backup storage device 410, or backup storage device 414), the entire stored directory structure is compressed as a whole.

Figure 5:
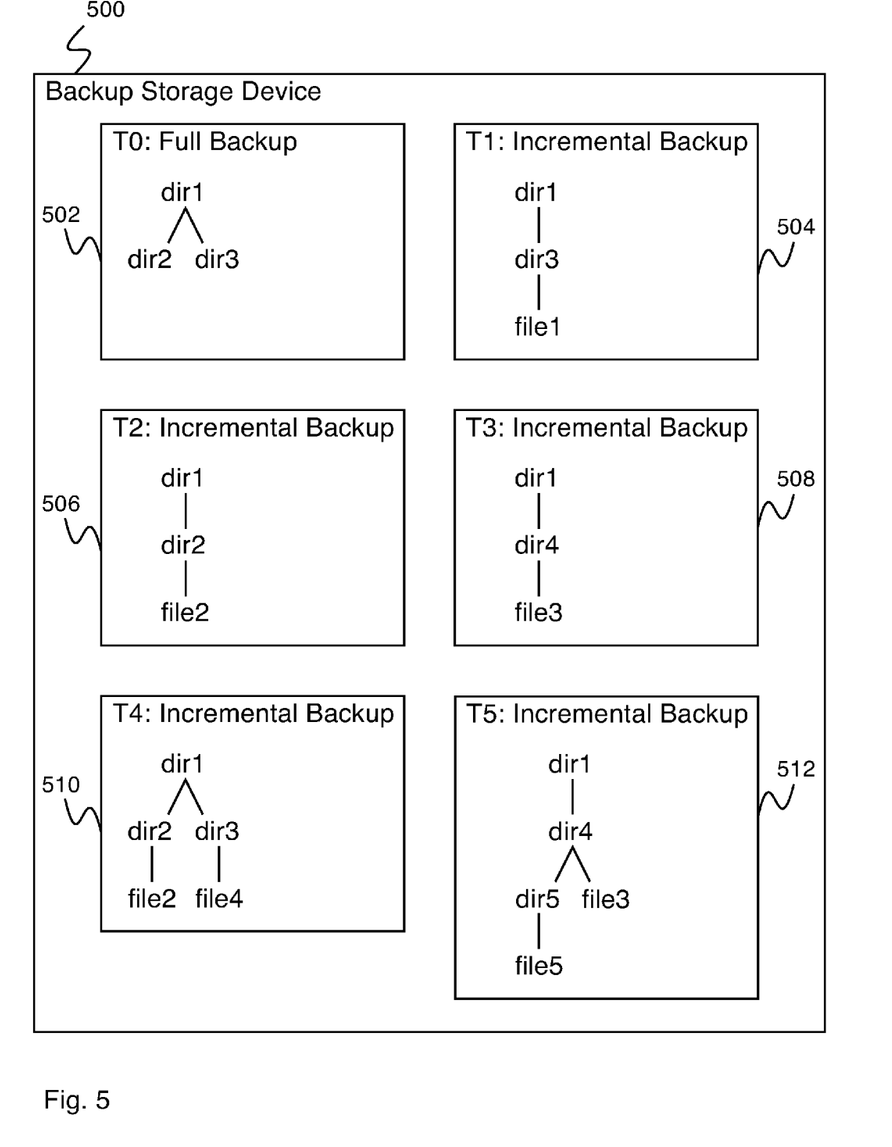
FIG. 5 is a block diagram illustrating an embodiment of a backup storage device.

FIG. 5 is a block diagram illustrating an embodiment of a backup storage device. In various embodiments, backup storage device 500 comprises backup storage device 108 of FIG. 1, backup storage device 110 of FIG. 1, or backup storage device 112 of FIG. 1. In some embodiments, backup storage device 500 stores backup records of a data storage device (e.g., data storage device 106 of FIG. 1). In the example shown, backup storage device 500 comprises full backup records and incremental backup records. Full backup 502 comprises a record of the complete state of the data storage device at time T0. Full backup 502 comprises root directory dir1, storing subdirectories dir2 and dir3. Incremental backup 504 comprises root directory dir1, storing subdirectory dir3, storing file file1. This indicates that the only change between time T0 and time T1 is the creation of file file1 in directory dir3. Directory dir2 has not been changed, so it is not present in incremental backup 504. Incremental backup 506 comprises root directory dir1, storing subdirectory dir2, storing file file2. This indicates that the only change between time T1 and time T2 is the creation of file file2 in directory dir2. Incremental backup 508 comprises root directory dir1, storing subdirectory dir4, storing file file3. This indicates that between time T2 and time T3, directory dir4 was created in directory dir1, and file file3 was created in directory dir4. Incremental backup 510 comprises root directory dir1, storing subdirectories dir2 and dir3. Subdirectory dir2 stores file file2 and subdirectory dir3 stores file file4. This indicates that between T3 and T4, file2 in directory dir2 was modified, and file file4 in directory dir3 was created. Incremental backup 512 comprises root directory dir1, storing subdirectory dir4, storing subdirectory dir5 and file file3. Subdirectory dir5 stores file file5. This indicates that between T4 and T5, directory dir5 was created in directory dir4, file file5 was created in directory dir5, and file file3 was created in directory dir4.

Figure 6:
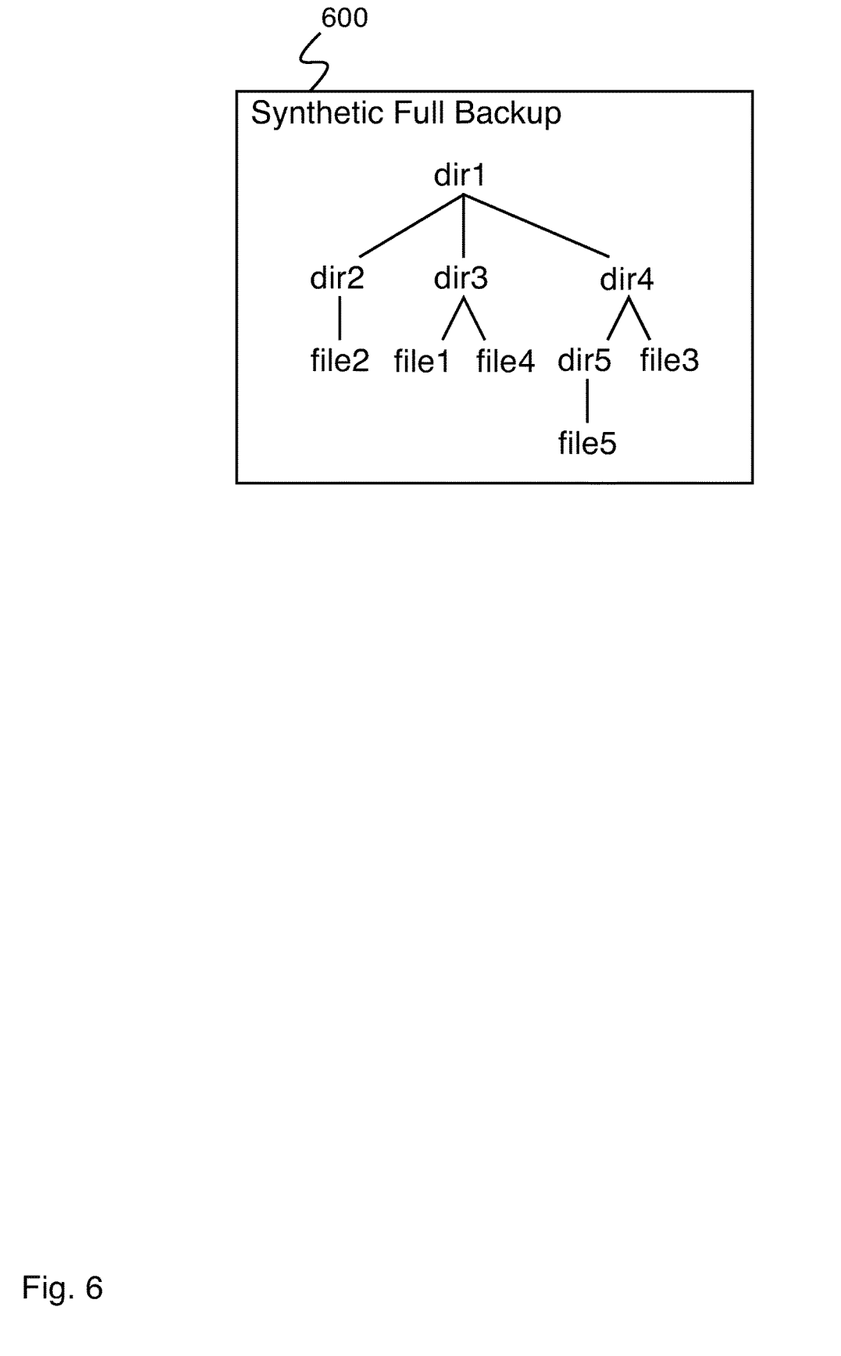
FIG. 6 is a block diagram illustrating an embodiment of a synthetic full backup.

FIG. 6 is a block diagram illustrating an embodiment of a synthetic full backup. In some embodiments, the synthetic full backup is stored on a backup storage device (e.g., backup storage device 108 of FIG. 1, backup storage device 110 of FIG. 1, or backup storage device 112 of FIG. 1). In some embodiments, a synthetic full backup comprises a full backup. In some embodiments, a synthetic full backup comprises a full backup created by the backup storage device from a full backup and subsequent incremental backups. In some embodiments, a synthetic full backup comprises a full backup created in order to speed future data restore processes. In some embodiments, synthetic full backup 600 comprises a synthetic full backup created on backup storage device 500 of FIG. 5. In some embodiments, synthetic full backup 600 comprises a synthetic full backup corresponding to the same data version as incremental backup 512 of FIG. 5. In the example shown, synthetic full backup 600 comprises root directory dir1, storing subdirectories dir2, dir3, and dir4. Subdirectory dir2 stores file2, subdirectory dir3 stores file1 and file4, and subdirectory dir4 stores subdirectory dir5 and file file3. Subdirectory dir5 stores file file5.

Figure 7A:
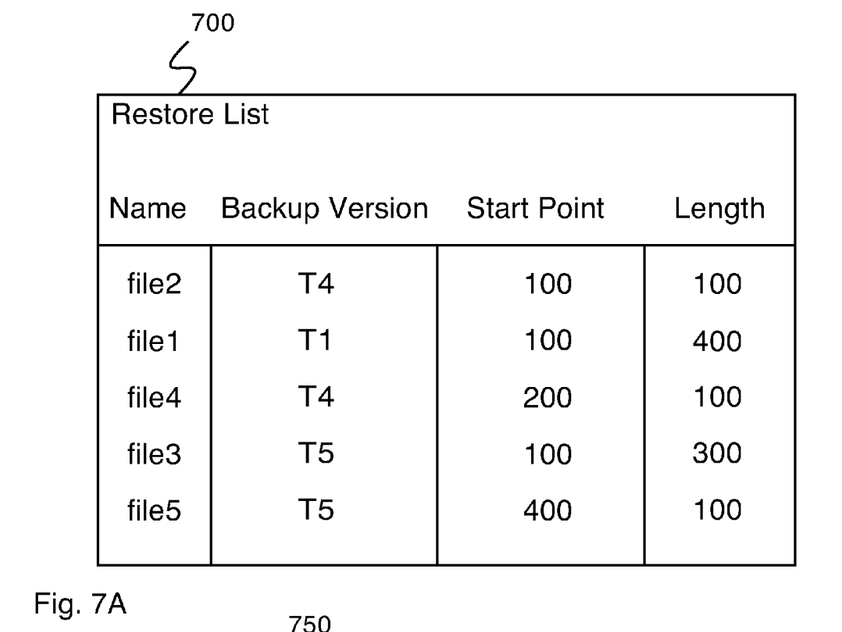
FIG. 7A is a diagram illustrating an embodiment of a restore list.

FIG. 7A is a diagram illustrating an embodiment of a restore list. In some embodiments, a restore list comprises names and locations of files for restoring data or for creating a synthetic full backup (e.g., synthetic full backup 600 of FIG. 6). In some embodiments, a restore list comprises a list of files backed up on a backup storage device (e.g., backup storage device 108 of FIG. 1, backup storage device 110 of FIG. 1, or backup storage device 112 of FIG. 1). In some embodiments, a restore list comprises a list of file locations on a backup storage device. In some embodiments, one or more of the file locations comprises a location that is associated with an incremental backup. In some embodiments, one or more of the file locations comprises a location that is associated with a full backup. In some embodiments, restore list 700 of FIG. 7 comprises a restore list created by backup storage device 500 of FIG. 5, for restoring data to time T5, corresponding to the version of the data when incremental backup 512 of FIG. 5 was created. In some embodiments, restore list 700 of FIG. 7A is used as part of creating synthetic full backup 600 of FIG. 6. In the example shown, restore list 700 comprises a list of files along with the backup version where the file is stored, the start point of the file within the backup, and the length of the file. File file2 is indicated as stored in the backup made at T4 (i.e., incremental backup 510 of FIG. 5). Since the version of file file2 made at T2 (i.e., and stored in incremental backup 506 of FIG. 5) has been superseded by the version made at T4, the version made at T2 is ignored. File file1 is indicated as stored in the backup made at T1. File file4 is indicated as stored in the backup made at T4. File file3 is indicated as stored in the backup made at T5. The version of file file3 stored in the backup made at time T3 has been superseded, and is ignored. File file5 is indicated as stored in the backup made at time T5.

Figure 7B:
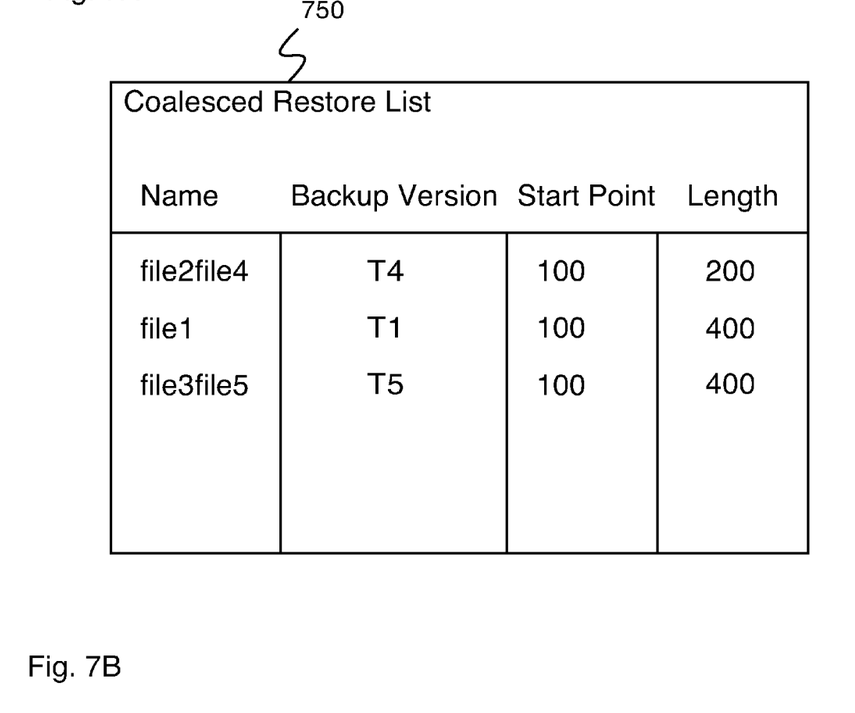
FIG. 7B is a diagram illustrating an embodiment of a coalesced restore list.

FIG. 7B is a diagram illustrating an embodiment of a coalesced restore list. In some embodiments, a coalesced restore list comprises a restore list wherein any files found to reside at adjacent points in the same backup version are merged so as to reduce the total number of retrieve file calls. In the example shown, coalesced restore list 750 comprises files file2file4, file1, and file3file5. File file2file4 comprises a merged version of files file2 and file4, as they were found to reside adjacently in the backup version made at T4. File file1 was not found to reside adjacently to any other files necessary for the restore list, and remains by itself. File file3file5 comprises a merged version of files file3 and file5, as they were found to reside adjacently in the backup version made at T5. In some embodiments, coalesced restore list 750 is created by processing a restore list (e.g., restore list 700 of FIG. 7A). In some embodiments, coalesced restore list 750 is created by checking files to see if they can be coalesced as they are added to the restore list, and an uncoalesced version is never explicitly created.

Figure 8A:
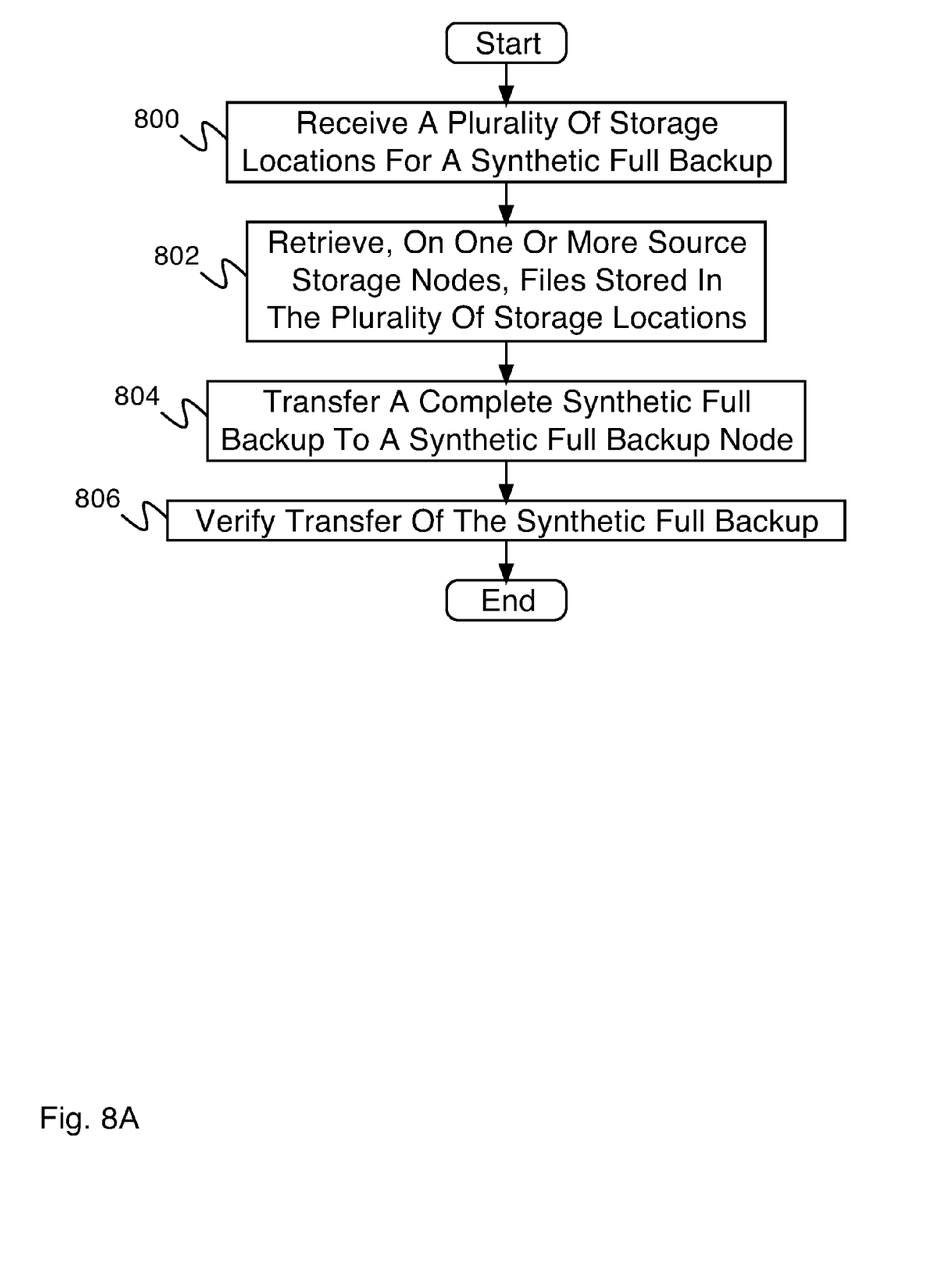
FIG. 8A is a flow diagram illustrating an embodiment of a process for creating a synthetic full backup.

FIG. 8A is a flow diagram illustrating an embodiment of a process for creating a synthetic full backup. In some embodiments, the synthetic full backup of FIG. 8 comprises the synthetic full backup 600 of FIG. 6. In some embodiments, the process of FIG. 8 is carried out by recover storage backend 400 of FIG. 4. In the example shown, in 800, a plurality of storage locations for a synthetic full backup are received. In some embodiments, the plurality of storage locations for a synthetic full backup comprise a restore list (e.g., restore list 700 of FIG. 7A). In some embodiments, the plurality of storage locations for a synthetic full backup comprise a coalesced restore list (e.g., coalesced restore list 750 of FIG. 7B). In some embodiments, the plurality of storage locations for a synthetic full backup are received from a recover storage front end (e.g., recover storage front end 402 of FIG. 4).

In 802, files stored in the plurality of storage locations are retrieved, on one or more storage nodes. In some embodiments, the files are retrieved by instructing one or more reader device manager (e.g., reader device manager 404 of FIG. 4, reader device manager 408 of FIG. 4) to retrieve files from one or more backup storage device (e.g., backup storage device 406 of FIG. 4, backup storage device 410 of FIG. 4) and return the files. In various embodiments, the retrieved files are uncompressed, unencrypted, undeduplicated, or processed in any other appropriate way after they are retrieved. In some embodiments, metadata is received (and stored while processing) with the file and/or the file list for uncompressing, unencrypting, undeduplicating files—for example, a compression type, compression key(s), encryption type, encryption key(s), deduplicating segment lists, or any other appropriate information for processing the data to regenerate the files. In some embodiments, it is determined based on the metadata received whether the files received are encrypted, compressed, and/or deduplicated, and then based on the determination, the files are unencrypted, uncompressed, and/or undeduplicated based at least in part on the metadata. In various embodiments, the one or more reader device managers uncompress, unencrypt, undeduplicate, or process the files in any other appropriate way before they are returned. The files, after retrieval and processing, are used to generate a synthetic full backup for transfer. In various embodiments, the synthetic full backup includes metadata information comprising directory structures, file names, file locations, index information, compression information, encryption information, redundancy information, or any other appropriate meta information. In some embodiments, the synthetic full backup comprises a partial backup as indicated by the recover list.

In 804, a complete synthetic full backup is transferred to a synthetic full backup node. In some embodiments, the complete synthetic full backup is transferred to the synthetic full backup node by instructing a writer device manager (e.g., writer device manager 412 of FIG. 4) to store the file in a backup storage device (e.g., backup storage device 414 of FIG. 4). In various embodiments, the complete synthetic full backup is compressed, encrypted, deduplicated, or processed in any other appropriate way before being stored. In 806, transfer of the synthetic full backup is verified. In various embodiments, verifying transfer of the synthetic full backup comprises calculating a checksum for the transferred file, comparing the transferred file with the original file, unencrypting an encrypted file, uncompressing a compressed file, or any other appropriate file verification technique. In some embodiments, the transfer of the synthetic full backup includes metadata for encryption, compression, or checksum calculation in the event that the transferred file is encrypted, compressed or checksumed. In various embodiments, the synthetic backup is compressed, encrypted, and/or deduplicated prior to or after transfer.

Figure 8B:
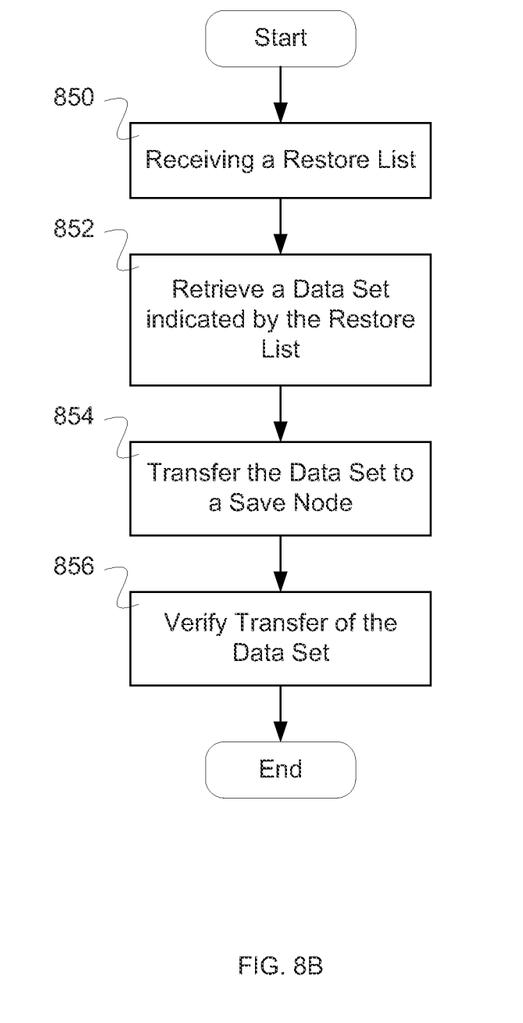
FIG. 8B is a flow diagram illustrating an embodiment of a process for efficient data rehydration.

FIG. 8B is a flow diagram illustrating an embodiment of a process for efficient data rehydration. In the example shown, in 850 a restore list is received. The restore list comprises a plurality of storage locations and lengths for performing data rehydration. In some embodiments, the restore list comprises a coalesced restore list where adjacent stored chunks are coalesced into a single chunk making the list shorter and the read calls longer as the adjacent chunks are read as a single chunk from a storage device. In various embodiments, the coalescing is performed when a location and length is added to the restore list, after a portion of the restore list is built, or after the entire list is built, or at any other appropriate time. In 852, a data set is retrieved indicated by the restore list. For example, the restore list indicates the plurality of storage locations and lengths storing chunks from a client system that were stored as part of a full or as an incremental backup session on a storage device attached to a storage node. In some embodiments, the storage locations are on one or more source storage nodes. For example, one or reader device managers are instructed to retrieve, on one or more storage nodes, from one or more backup storage devices and return data as defined by the restore list (e.g., as offsets and lengths on the device on the node). In various embodiments, the data is uncompressed, unencrypted, undeduplicated, or processed in any other appropriate way after the data is retrieved. In some embodiments, metadata is received (and stored while processing) with the data and/or the restore list for uncompressing, unencrypting, undeduplicating files—for example, a compression type, compression key(s), encryption type, encryption key(s), deduplicating segment lists, or any other appropriate information for processing the data to regenerate the data. In some embodiments, it is determined based on the metadata received whether the data received is encrypted, compressed, and/or deduplicated, and then based on the determination, the data is unencrypted, uncompressed, and/or undeduplicated based at least in part on the metadata. In various embodiments, the one or more reader device managers uncompress, unencrypt, undeduplicate, or process the data in any other appropriate way before they are returned. The data, after retrieval and processing, is used to generate a data set for transfer. In various embodiments, the data set includes metadata information comprising directory structures, file names, file locations, index information, compression information, encryption information, redundancy information, or any other appropriate meta information. In some embodiments, the data set comprises a partial backup as indicated by the recover list.

In 854, the data set is transferred to a save node. In some embodiments, the data set is transferred to the save node by instructing one or more writer device managers to store the data set on a backup storage device. In various embodiments, the data set is compressed, encrypted, deduplicated, or processed in any other appropriate way before being stored.

In 856, the transfer of the data set is verified. In various embodiments, verifying transfer of the data set comprises calculating a checksum for the transferred data set, comparing the transferred data set with the original data set, unencrypting an encrypted data set, uncompressing a compressed data set, or any other appropriate data set verification technique. In some embodiments, the transfer of the data set includes metadata for encryption, compression, or checksum calculation in the event that the transferred data set is encrypted, compressed or checksumed. In various embodiments, the data set is compressed, encrypted, and/or deduplicated prior to or after transfer.

Figure 9:
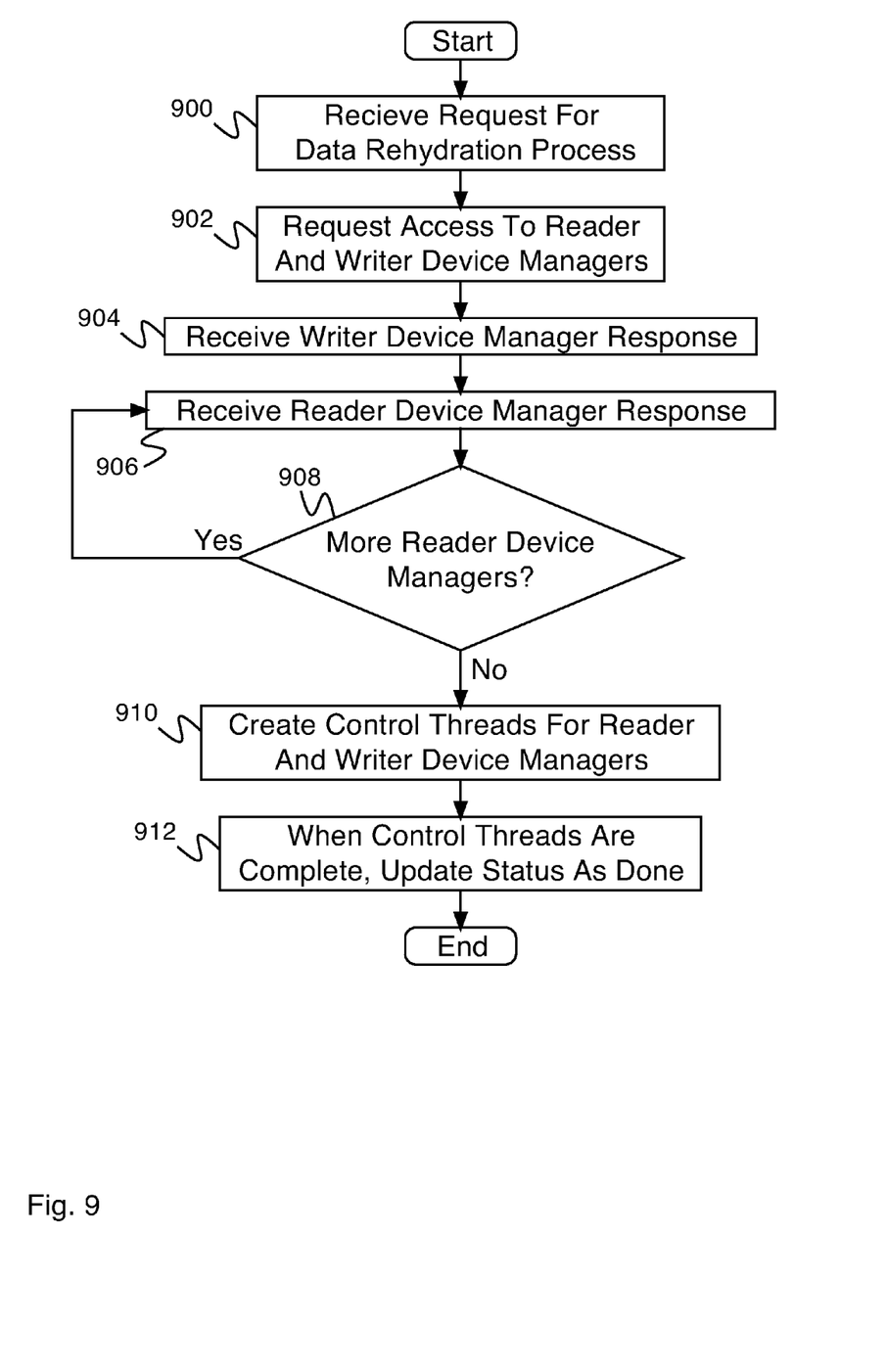
FIG. 9 is a flow diagram illustrating a process for executing an efficient data rehydration process.

FIG. 9 is a flow diagram illustrating a process for executing an efficient data rehydration process. In some embodiments, the process of FIG. 9 is carried out by recover storage backend 400 of FIG. 4. In various embodiments, an efficient recover storage or efficient data rehydration process comprises creation of a synthetic full backup, creation of a data storage device clone, staging of a data storage device, or any other appropriate efficient data rehydration. In the example shown, in 900, a request for a data rehydration process is received. In some embodiments, the request for a data rehydration process is received from data rehydration front end 402 of FIG. 4. In some embodiments, the request for a data rehydration process comprises data necessary for the data rehydration process (e.g., a restore list). In 902, access to reader and writer device managers (e.g., reader device manager 404 of FIG. 4, reader device manager 408 of FIG. 4, writer device manager 412 of FIG. 4) is requested. In some embodiments, the reader and writer device managers requested depend on the content and type of the request received in 900. In 904, the writer device manager response is received. The writer device manager response comprises a message indicating the writer device manager is ready. In some embodiments, the writer device manager response additionally includes information describing the writer device manager software and the backup storage device it is connected to. In 906, the reader device manager response is received. The reader device manager response comprises a message indicating the reader device manager is ready. In some embodiments, the reader device manager response additionally includes information describing the reader device manager software and the backup storage device it is connected to. In 908 it is determined if more reader device managers are necessary for the data rehydration process. Different data rehydration processes require different numbers of reader device managers. In the event more reader device managers are required, control passes to 904. In the event that more reader device managers are not required, control passes to 910.

In 910, control threads are created for the reader and writer device managers. Control threads for the reader and writer device managers comprise instructions for the reader and write device managers to execute a data rehydration process. For example, a restore list is decomposed based on storage volume and save sets and the read storage node(s) where the process(es) (e.g., thread(d)) is/are to be spawned is/are determined. Each spawned process receives a unique process ID, a request ID, an operation ID, and an operation type. The write process(es) (e.g., Thread(s)) is/are run on target storage node(s). For a given read thread or process, the thread processes a list of reads from the restore list for the storage volume and/or save set associated with the thread. The process reads and stores the data read in a read thread queue. The read thread queue includes a list indicating the data stored in the read thread queue. In some embodiments, the read thread queue has associated information including a recover session ID, a save set ID, a clone session ID, an operation type (e.g., save set consolidation, cloning, staging, synthetic full generation, etc.), a number of completed saves, an operation status (e.g., full, started, partial, empty, done, etc.), etc. The write thread is notified that there is data available in the read thread queue ready for writing out. In some embodiments, the notification is passed using an event queue.

In some embodiments, the read thread reads in data from the storage device to which it is bound and fills one or more buffers (e.g., at the read thread's choice 1 buffer, 2 buffers, 100 buffers, etc. are read). The read thread then informs one or more write threads that the filled one or more buffers are ready for writing (e.g., by indicating using a queue for a write thread or by any other means for indicating that a buffer has been filled after reading from a device). Each write thread then writes the data in each of the filled one or more buffers to the storage device to which it is bound. The buffers, once the data has been written using the one or more write threads to each of the bound one or more storage devices bound to the write thread, are then released and can be used by a read thread for another reading of data. In various embodiments, a read thread decrypts, decompresses, and/or un-deduplicates data before placing the data in a buffer. In various embodiments, a write thread encrypts, compresses, and/or deduplicates data before writing the data to a bound storage device.

In 912, when the control threads are complete, the data rehydration process status is updated as done.

Figure 10:
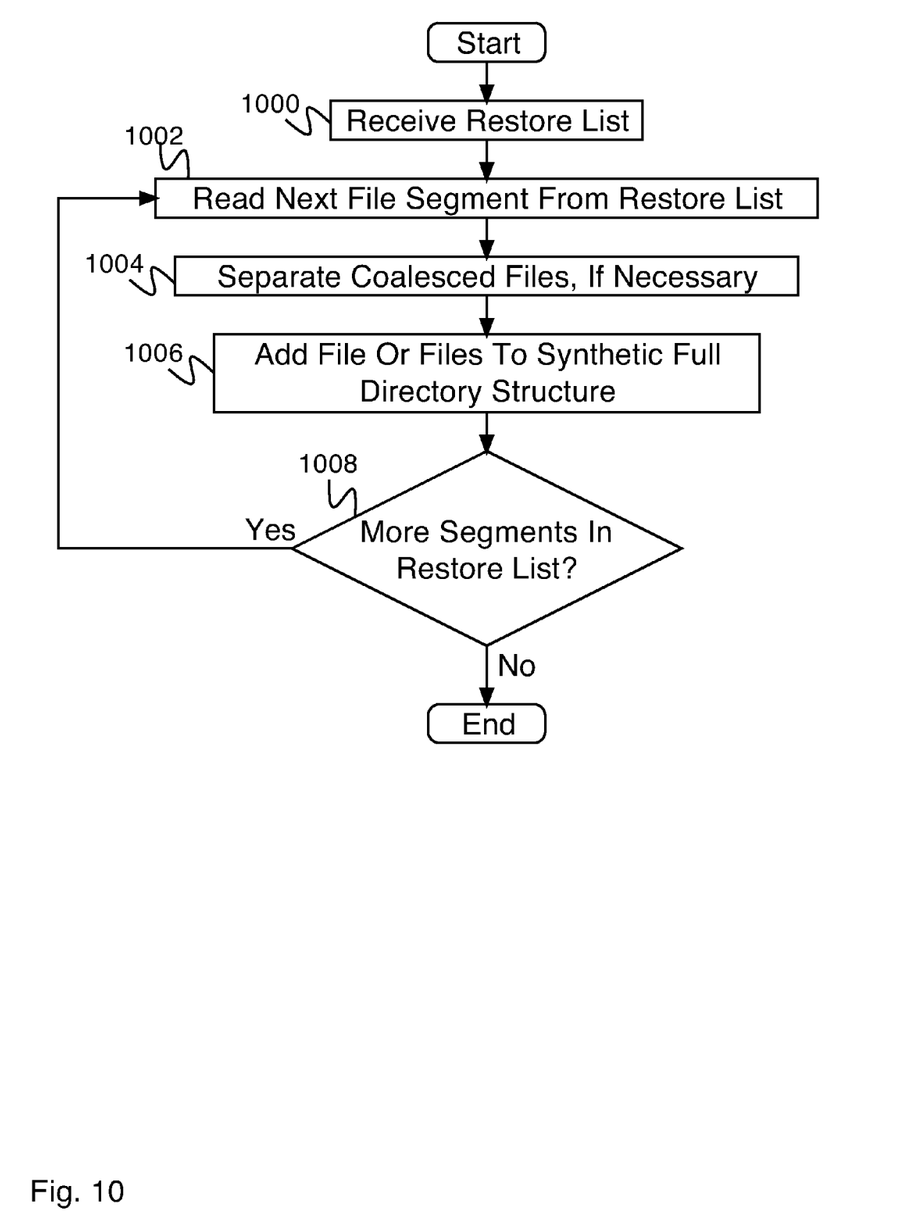
FIG. 10 is a flow diagram illustrating an embodiment of a process for building a synthetic full backup.

FIG. 10 is a flow diagram illustrating an embodiment of a process for building a synthetic full backup. In some embodiments, the synthetic full backup of FIG. 10 comprises synthetic full backup 600 of FIG. 6. In 1000, a restore list is received (e.g., restore list 700 of FIG. 7A or coalesced restore list 750 of FIG. 7B). In 1002, the next segment is read from the restore list. In some embodiments, reading the next file segment from the restore list comprises contacting the appropriate reader device manager (e.g., reader device manager 404 of FIG. 4, reader device manager 408 of FIG. 4) and indicating the appropriate file segment to read. In 1004, coalesced files are separated, if necessary. In some embodiments, in the event that multiple entries in the restore list describe files that are located adjacently on the same backup device, the multiple entries are combined into one, such that they can be retrieved with a single file segment read. After the coalesced file is read, it is separated into the original multiple files, and the files are processed individually. In 1006, the file or files are added to the synthetic full directory structure. Each file segment read describes a file of a directory structure, of which the synthetic full will be a replica of when it is complete. The files read are added to the directory structure in their appropriate place. In 1008, it is determined whether there are more segments in the restore list. In the event that there are more segments in the restore list, control passes to 1002. In the event that there are not more segments in the restore list, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an efficient data rehydration comprising:
an interface configured to receive a restore list comprising a plurality of storage locations and lengths for performing a data rehydration; and
a computer processor configured to:
retrieve, from one or more storage nodes, a data set indicated by the restore list, wherein the plurality of storage locations and lengths indicate chunks from a client system stored as part of a full or as an incremental backup session on a storage device attached to a storage node of the one or more storage nodes, wherein the restore list is created by coalescing files as they are added to the restore list, wherein coalescing comprises merging the files in the event that the files reside at adjacent points in the full or the incremental backup session;
transfer the data set to a save node; and
verify the transfer of the data set.

2. A system as in claim 1, wherein the performing the data rehydration is part of generating a full synthetic backup.

3. A system as in claim 1, wherein the performing the data rehydration is part of generating a clone.

4. A system as in claim 1, wherein the processor is further configured to determine whether the files are encrypted.

5. A system as in claim 4, wherein the processor is further configured to receive an encryption key associated with the files.

6. A system as in claim 5, wherein the files are decrypted before transferring the data set using the encryption key.

7. A system as in claim 1, wherein the processor is further configured to determine whether the files are compressed.

8. A system as in claim 7, wherein the processor is further configured to receive a compression key associated with the files.

9. A system as in claim 8, wherein the files are decompressed before transferring the data set using the compression key.

10. A system as in claim 1, wherein the processor is further configured to determine whether the files are deduplicated.

11. A system as in claim 10, wherein the processor is further configured to receive deduplication information associated with the files.

12. A system as in claim 11, wherein the files are undeduplicated before transferring the data set using the deduplication information.

13. A system as in claim 1, wherein the processor is further configured to in the event that the dataset is to be encrypted, encrypt the data set before transfer.

14. A system as in claim 1, wherein the processor is further configured to in the event that the data set is to be compressed, compress the data set before transfer.

15. A system as in claim 1, wherein the processor is further configured to in the event that the data set is to be deduplicated, deduplicate the data set before transfer.

16. A method for efficient data rehydration, comprising:
receiving, using an interface, a restore list comprising a plurality of storage locations and lengths for performing a data rehydration;
retrieving, using a computer processor, from one or more storage nodes, a data set indicated by the restore list, wherein the plurality of storage locations and lengths indicate chunks from a client system stored as part of a full or as an incremental backup session on a storage device attached to a storage node of the one or more storage nodes, wherein the restore list is created by coalescing files as they are added to the restore list, wherein coalescing comprises merging the files in the event that the files reside at adjacent points in the full or the incremental backup session;
transferring the data set to a save node; and
verifying transfer of the data set.

17. A computer program product for efficient data rehydration, the computer program product being embodied in a tangible computer readable storage medium and comprising computer instructions for:
receiving, using an interface, a restore list comprising a plurality of storage locations and lengths for performing a data rehydration;
retrieving, using a computer processor, from one or more storage nodes, a data set indicated by the restore list, wherein the plurality of storage locations and lengths indicate chunks from a client system stored as part of a full or as an incremental backup session on a storage device attached to a storage node of the one or more storage nodes, wherein the restore list is created by coalescing files as they are added to the restore list, wherein coalescing comprises merging the files in the event that the files reside at adjacent points in the full or the incremental backup session;
transferring the data set to a save node; and
verifying transfer of the data set.

* * * * *